United States Patent [19]
Geddes et al.

[11] Patent Number: 5,585,129
[45] Date of Patent: Dec. 17, 1996

[54] PROCESS OF USING A PERFORATED PACKAGE OF A COMPOSITE INTEGRAL MATERIAL

[75] Inventors: Daniel J. Geddes, Appleton; Kathy Rigotti, Neenah, both of Wis.; Linda L. Bunker, Rainier, Wash.; Patrick L. Maynard, Combined Locks, Wis.; Robert Patterson; David H. Hollenberg, both of Neenah, Wis.; Arthur C. Berger, Mound, Minn.

[73] Assignee: The James River Corporation, Richmond, Va.

[21] Appl. No.: 474,129

[22] Filed: Jun. 7, 1995

Related U.S. Application Data

[62] Division of Ser. No. 385,781, Feb. 9, 1995, which is a division of Ser. No. 909,172, Jul. 6, 1992, Pat. No. 5,399,366.

[51] Int. Cl.$^6$ .............................. B32B 7/10; B65D 30/08; B65D 85/00
[52] U.S. Cl. .............................. 426/394; 53/480; 53/481; 53/482; 426/415
[58] Field of Search ...................... 426/394, 410, 426/415; 53/476, 480, 481, 482

[56] References Cited

U.S. PATENT DOCUMENTS

| | | | |
|---|---|---|---|
| 4,608,259 | 8/1986 | Cortopassi | 229/938 |
| 4,618,992 | 10/1986 | La Grotteria | 383/207 X |
| 4,735,308 | 4/1988 | Barner | 383/113 X |
| 4,889,731 | 12/1989 | Williams, Jr. | 426/106 |
| 4,984,907 | 1/1991 | Power | 383/113 X |
| 5,094,863 | 3/1992 | Vandenburg | 426/115 |
| 5,128,182 | 7/1992 | Bunker, et al. | 428/34.3 |
| 5,199,792 | 4/1993 | Roosa | 383/4 |
| 5,310,587 | 5/1994 | Akahori et al. | 383/113 X |
| 5,335,996 | 8/1994 | Cortopassi et al. | 229/87.05 X |
| 5,346,312 | 9/1994 | Mabry et al. | 383/101 X |
| 5,376,392 | 12/1994 | Ikegami et al. | 383/113 X |
| 5,399,366 | 3/1995 | Geddes et al. | 426/87 |

*Primary Examiner*—Leo B. Tentoni
*Attorney, Agent, or Firm*—Finnegan, Henderson, Farabow, Garrett & Dunner, L.L.P.

[57] ABSTRACT

A perforated package of a composite integral sheet material which includes a first layer of absorbent material, a second layer of printable material and an impermeable pigmented polymer layer interposed between the first and second layers. The composite material has a plurality of air pockets formed between at least one of the first or second layers and the polymer layer, by discontinuously bonding the first or second layers to the polymer material. The package has two parallel lines of perforation which allow access to the interior of the package and to the foodstuff contained therein. A method of using the perforated package of composite integral material.

7 Claims, 3 Drawing Sheets

PROCESS OF USING A PERFORATED PACKAGE OF A COMPOSITE INTEGRAL MATERIAL

This is a division of application Ser. No. 08/385,781, filed Feb. 9, 1995, currently pending, which is a division of application Ser. No. 07/909,172, filed Jul. 6, 1992, now U.S. Pat. No. 5,399,366, issued Mar. 21, 1995, the entire subject matters of which are incorporated herein by reference.

BACKGROUND

1. Field of the Invention

This invention relates to a perforated package made from integral composite materials, and more particularly to a perforated bag of integral composite materials. The invention further relates to the use of the perforated package primarily for packaging hot foodstuffs, with the composite material facilitating heat retention moisture control and masking of food staining.

2. Background of the Invention

Hot sandwiches are ideal for convenience foods in many ways, they can be quickly prepared, quickly consumed, utensils are not required and basic ingredients from a reasonable selection can be combined in countless variations to provide a wide variety of appetizing sandwiches. However, the perfect convenience food could be prepared before it is needed, stored, then served almost immediately after the customer places his order. In this respect, hot sandwiches fall short of being perfect convenience foods, as it is difficult to provide a suitable but inexpensive and ecologically sound environment for maintaining hot sandwiches in palatable condition for the storage interval between preparation and consumption, particularly for periods of more than several minutes.

Styrofoam clamshells have been used but many who are concerned about the environment feel that the clamshell requires too much volume in landfill, is not at all biodegradable and is quite difficult to economically recycle. Further, they only provide for rather limited storage periods. However, they do protect the sandwich from physical deformation rather well while the top gives the customer a convenient spot for French fries or onion rings.

Composite wrap materials have long been used to package hot foodstuffs. In addition to keeping the foodstuff relatively fresh for a period of time, the wrap facilitates heat retention by the foodstuff after it is made, but before it can be consumed. Further the wrap presents the food in an eye appealing manner.

A disadvantage of these known food wrap composite materials is that, at best, most utilize only two layers (two-ply)—typically a thermoplastic layer and a second paper layer. If, for example, the second paper layer is used on the outer surface of the wrap-away from the foods to permit printing of a logo, name, descriptions, etc.—then there is no inner absorbent layer to absorb any excess vapor which may not escape through a semi-permeable thermoplastic inner layer, but which may condense on that layer and then be absorbed by the foodstuff. In addition, grease may collect on the thermoplastic layer and also be absorbed by the foodstuff. Both the condensed vapor and grease can contribute to unsightly stains and, even worse, to make the heated foodstuff soggy and unpalatable.

Recently introduced composite wraps alleviate many of the grease and moisture control difficulties experienced with conventional commercial wraps such as polyethylene coated paper, hot melt coated paper, foil/tissue laminations, dry wax, and the like. These newer composite wraps (prepared according to pending parent U.S. patent application Ser. No. 07/372,165, now abandoned incorporated herein by reference) largely overcome many moisture and grease control problems, especially for single patty hamburgers and cheeseburgers. In the case of sandwiches evolving particularly large amounts of steam or grease, however, a sacrifice of heat retention or storage time (holding period) could be required to avoid problems due to excessive moisture and grease evolved. Upon prolonged holding, especially large amounts of moisture are typically evolved from sandwiches having multiple patties or those containing portions which evolve especially large amounts of moisture, such as over about four ounces of hamburger or so.

In an alternative embodiment, additional new composite wrap materials (prepared according to pending parent application Ser. No. 07/714,928, filed Jun. 13, 1991, now abandoned which is incorporated herein by reference) provide greatly improved moisture control while decreasing adhesive tendencies between sandwich components and the absorbent inner layer by interposing a foraminous hydrophobic water-vapor-permeable pellicle on fibers positioned between the sandwich and a moisture-vapor-impermeable polymeric layer. Surprisingly, the moisture control properties remain even if the entirety of absorbent portions of the wrap interior to the moisture-vapor-impermeable layer is provided with the foraminous-hydrophobic water-vapor-permeable pellicle. In preferred embodiments of this composite material, highly absorbent materials are included in at least a portion of the absorbent layer between the pellicle bearing fibers and the water-vapor-impermeable film. The word "pellicle" was chosen to describe the "deposit" or "precipitate" left behind after hydrophobe precursor has been applied to fibers and the carrier removed. The word "pellicle" was chosen because it has the connotation of being very thin and not necessarily continuous. As will be seen, release and hydrophobic properties can result from extremely thin pellicles which do not necessarily encompass the entirety of the surface of the fiber.

These composite wrap materials while addressing percieved ecological concerns surrounding the styrofoam clamshells, have the disadvantage that they provide difficulties to the consumer in handling the food items and consuming the hot food items while on the go. Flat composite wraps do not provide a convenient method for the consumer to unwrap and consume the food product. In addition, consumers often use the outside surface of the food package or wrap or the outside of the take out bag to provide a surface upon which to rest the hot food article. These packages and wraps which bear printed material on the exterior surface thereof and which are handled by a number of individuals within the food service establishment can not provide a sanitary surface upon which to rest the food article. These disadvantages have been overcome by the present invention.

U.S. Pat. No. 5,094,863 is directed to a bag which is formed from the three layer composite wrap material as described above, having a rip cord to allow easy entry into the bag. This bag provides a means for protecting consumers' hands while holding the food product but does not address the need for a sanitary surface from which to consume food products. In addition, unlike the present invention, the bag according to U.S. Pat. No. 5,094,863 only provides an easy method for opening the bag and does not provide a convenient means for consuming a food product while maintaining the food product in a partially wrapped condition to prevent cooling of the product and soiling of the customer.

SUMMARY OF THE INVENTION

The objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in according with the purpose of the invention, as embodied and broadly described herein, there is disclosed:

A perforated package of a composite integral material, where the material includes a first layer of absorbent material, a second layer of printable material, and a water vapor impermeable polymer layer interdisposed between the first and second layers. At least one of the first and second layers is discontinuously bonded to a respective side of the polymer layer at spaced locations, so that at least one of the first and second layers forms air pockets with the polymer layer at locations between the bond locations. The material forms a package having perforation means to allow a portion of the material to be folded or removed to expose substantially all of the interior of the package.

There is further disclosed:

A perforated package of a composite integral material, where the material includes a first layer of absorbent material, a second layer of printable material, a water-vapor-impermeable polymer layer interdisposed between the first and second layers and treated fibers in said first layer at least adjacent to the face thereof away from said water-vapor-impermeble polymeric layer. Each treated fiber bears a foraminous hydrophobic water-vapor-permeable pellicle. At least one of the first and second layers is discontinuously bonded to a respective side of the polymer layer at spaced locations, so that at least one of the first and second layers forms air pockets with the polymer layer at locations between the bond locations. The material forms a package being perforated to allow access to the interior of the package.

In a preferred embodiment of this composite integral material, at least a portion of the first layer will also include highly absorbent material comprising the reaction product of in-situ crosslinking of water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in a one square foot sheet being sufficient to absorb at least 1 gram of water.

The accompanying drawings, which are incorporated in and constitute a part of the specification, illustrate various aspects of the invention and, together with the description, serve to explain the principles of the invention.

DESCRIPTION OF THE PREFERRED EMBODIMENTS

The present invention is directed to a receptacle for foodstuff which provides the consumer with ease of handling while maintaining the foodstuff in a hot and palatable condition. In addition, the present invention provides a clean, sanitary surface upon which to rest food articles while consuming them.

The present invention is a perforated package made from a composite integral sheet material, described below. According to a preferred embodiment of the present invention a bag is formed which has at least one area of perforation allowing a portion of the bag to be drawn back providing easy access to the article contained therein. The shape of the package is not critical and shapes which would be applicable are readily recognizable to the skilled artisan. These shapes would include, for example, a bag, a sack, a pouch, a cone and a box. The term "bag" is defined as a package made of a flexible material and having an opening for receiving an item. Sealing can include, for example, hot melt sealing, cold seal glue and folding. In one embodiment, the material has sufficient deadfold to allow sealing the package by folding it at the opening. With sufficient deadfold in the material of construction, the portion of material extending beyond the fold need not be placed beneath the package to maintain the folded seal.

In one embodiment, the package has at least one area of perforation which allows a panel of the bag to be drawn back, exposing the interior of the package and any article therein. The location of the area of perforation may vary as will be obvious to the skilled artisan. In the preferred embodiment, the perforated area comprises two parallel lines of perforation. These lines are preferably located along or closely adjacent to the edges of the package, and more preferably originate in at least one the four corners of the package. The lines of perforation may, however extend diagonally from corner to corner across the face of a panel. The areas of perforation can be any size and shape. The areas of perforation are constructed to allow easy access to the interior of the package and any article therein. In one preferred embodiment, the bag has two lines of perforations which extend longitudinally down one face of the bag, preferably originating in opposite corners.

Figure 1:
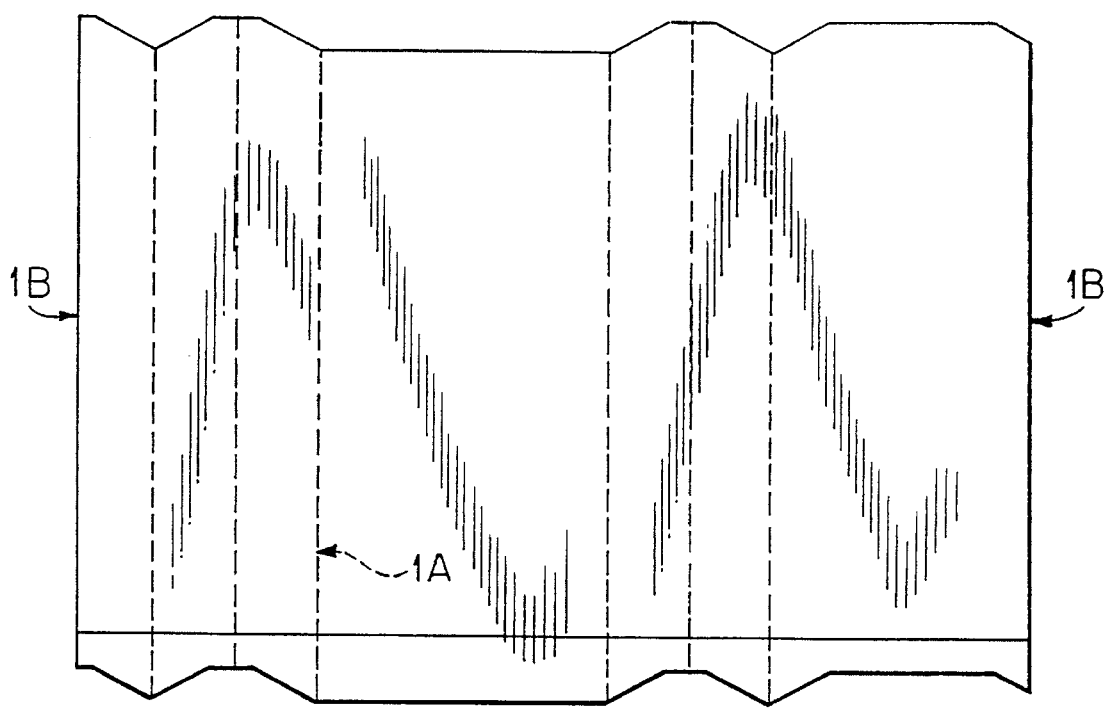
FIG. 1 illustrates a perforated bag which has been unfolded to illustrate its configuration.

The perforated bag according to the present invention may be gussetted, having two major panels which are joined by four minor panels as shown in FIG. 1 of U.S. Pat. No. 5,094,863 which is hereby incorporated by reference. Alternatively, the bag may be ungussetted having two major panels which are joined to one another.

The package according to the present invention need not take the shape of a bag but may be formed as a pouch having two adjacent sides which are open and two sides forming a pocket. One of the sides being formed by a fold along one edge, the other being formed by folding two edges of the sheet over then sealing them together.

In use, the food product, preferably hot, is put into the bag, the open end is sealed and the bag with the foodstuff in it is given to the customer. The bag may be used in a variety of ways by the customer. The following examples of use are merely illustrative and additional uses for the bag of the present invention will be obvious to the skilled artisan.

If the customer is a carryout customer, he can pull a small portion of the wrap down allowing him to hold the foodstuff while it is in the bag and successively revealing portions of it while he eats and walks, or drives, for example, along the highway. If he eats in the store, at a table, he can pull the bag side panel down along the perforations, all at once, thus providing the surface upon which the food article rests and revealing an inner panel to which he may liberally apply ketchup in which his French fries can be dipped. Thus, the bag according to the present invention provides sanitary surfaces which have not been previously handled upon which food articles may be rested.

The perforated package according to the invention can be used to contain a variety of hot food articles. The package can be used for traditional convenience foods such as hamburgers, cheeseburgers tacos, burritos, pizzas and French fries. The perforated package according to the present invention has a number of uses outside what are thought to be traditional uses for composite sandwich wraps. The package of the present invention is applicable to any use which requires the unique properties that the composite imparts to the package such as for frozen confections, candy flowers, pretzels, fruit and popcorn. The package according to the predsent invention also has potential uses outside the convenience food industry in for example, the medical or pharmaceutical industries.

Figure 5:
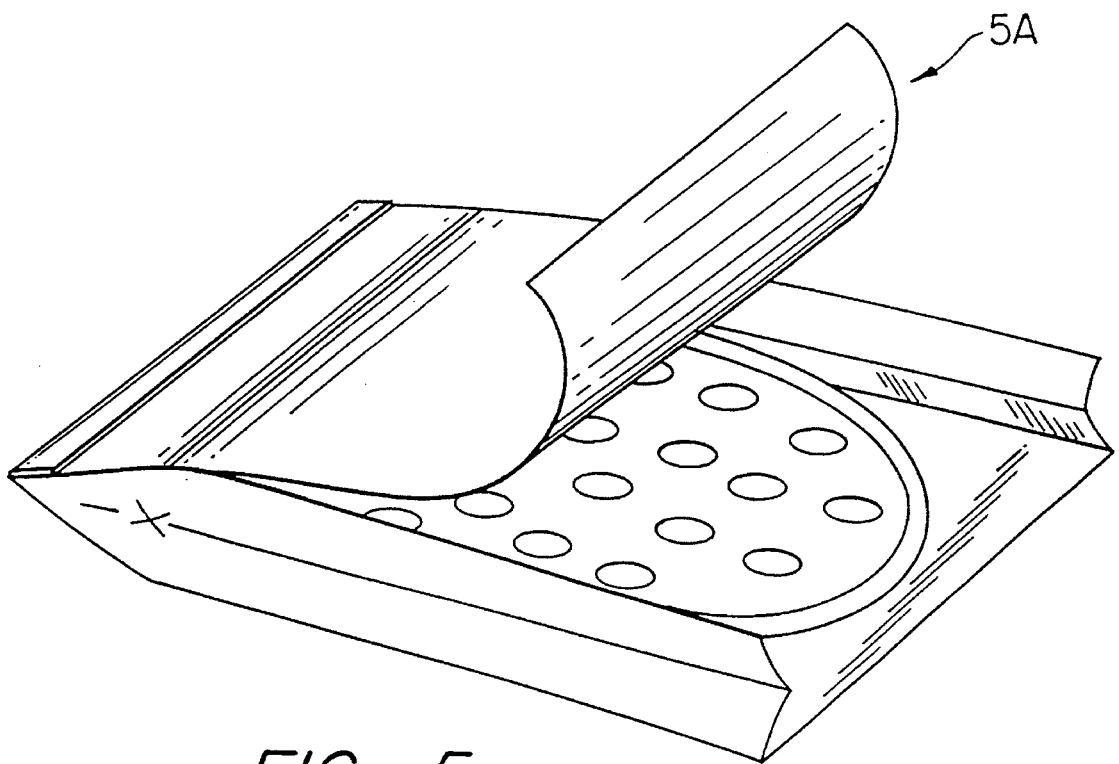
FIG. 5 illustrates opening of a perforated bag which contains a large item, such as a pizza.

In addition, as shown in FIG. 5, the bag of the preferred embodiment can be used with larger items, for example, the bag would be suitable for enclosing a pizza. Under many circumstances, the pizza will be supported on a cardboard tray within the pizza bag. The pizza bag merely rips open to reveal the pizza contained therein.

Figure 2:
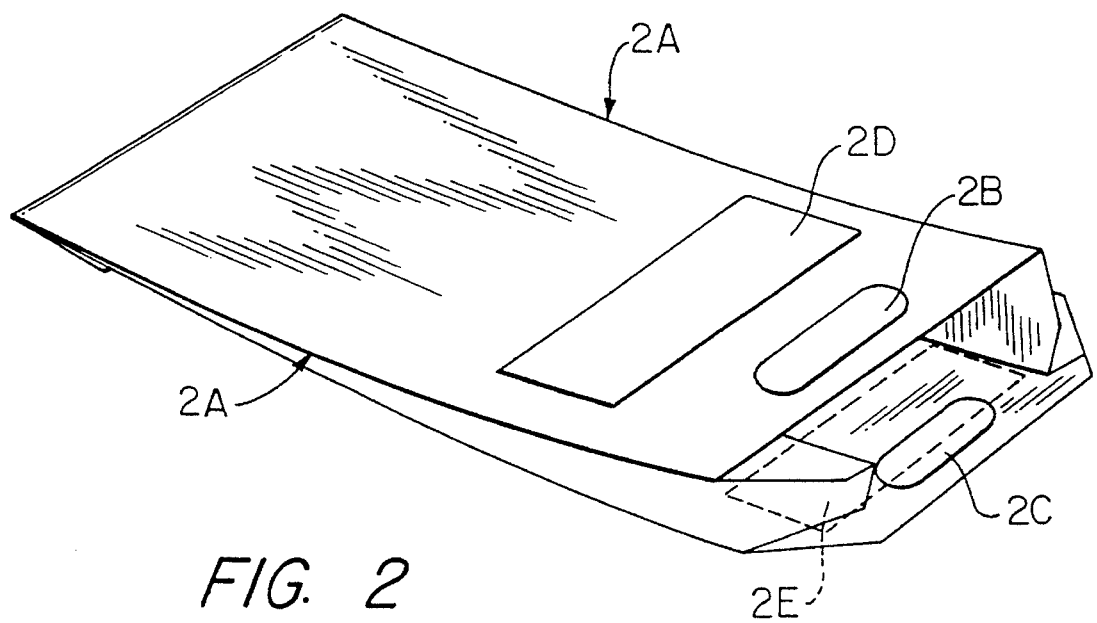
FIG. 2 illustrates a perforated bag in an open condition ready to receive the foodstuff.

In another preferred embodiment of the bag, cold seal glue will be placed on the upper portions of the bag such as in the locations indicated by areas 2B and 2C in FIG. 2 in which area 2B is on the exterir of the bag and is mateable with area 2C on the interior surface. Alternatively, the glue may be applied as indicated in FIG. 2 by areas 2D and 2E, as this eliminates the necessity for putting any glue on the inside of the bag and thus obviates the possibility of contact between the glue and the foodstuff. Alternatively, the bag may be sealed in a variety of manners which are well known to the skilled artisan.

In one embodiment, indicia indicating the lines of perforation will be located on the bag to indicate the proper mode of opening to the customer. Such indicia will be located on, the external surface of the bag along with any additional printed information. Since the external surface never contacts the food article, the bag according to the invention provides a more sanitary environment for consumption of convenience than previously possible.

FIG. 1 shows the perforated bag of the preferred embodiment of the present instant invention which has been unfolded to illustrate its configuration. 1A indicates the position of fold lines for forming the final bag. 1B indicates the edges of the seam which must be sealed. Sealing can be done by gluing, heat sealing or other methods, all of which are within the skill of the artisan.

Alternative configurations for forming the bag include those which are known within the art of would be recognizable to the skilled artisan. For example, the bag may be formed of two sheets of composite material which are heat sealed along two or three edges. The Figures illustrate a preferred embodiment and are not deemed to be limiting.

Figure 4:
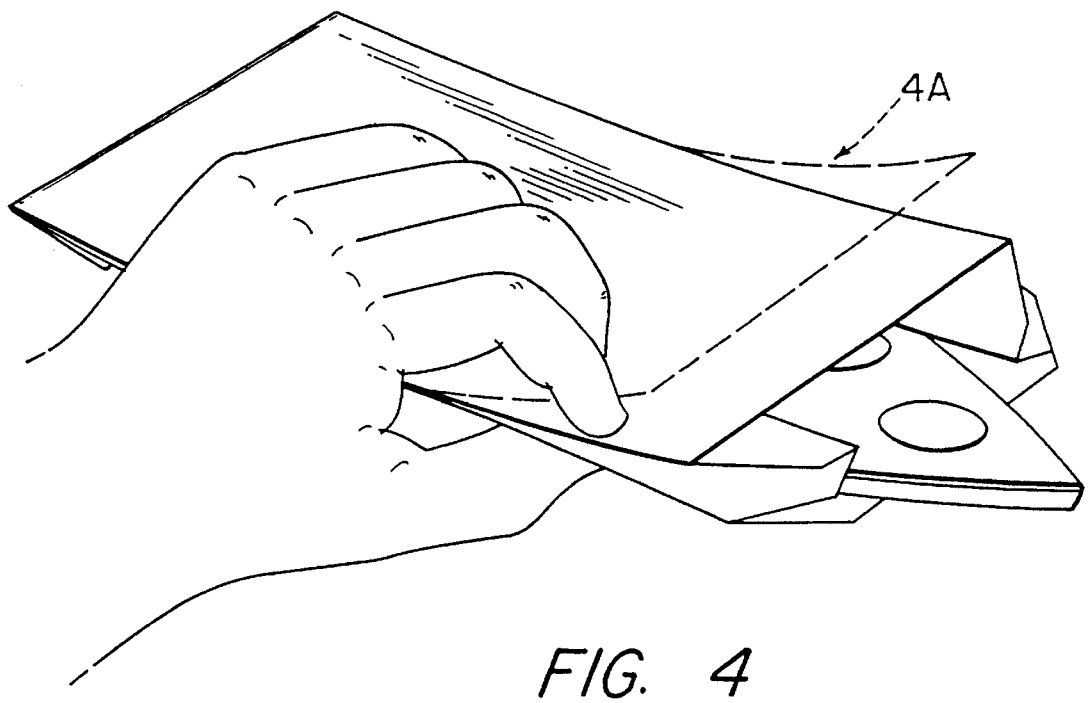
FIG. 4 illustrates a perforated bag as it may be opened to allow consumption of the foodstuff.

FIG. 2 illustrates the perforated bag according to the present invention in an open condition ready to receive the food article. 2A represents the longitudinal edges of the top panel of the bag. In the one preferred embodiment, the lines of perforation run contiguous with and along the fold lines 2A. In another embodiment, the lines of perforation may be less than ¾" from the fold lines 2A, more preferably less than ¼" from the fold lines 2A. The location of the perforations along or near the longitudinal edges 2A allows the top panel of the bag to be drawn back to reveal the food article and allow easy access thereto, as illustrated in FIG. 4.

FIG. 2 also indicates one manner of sealing the bag after the food article has been place therein. As noted by the areas 2B, 2C, 2D and 2E, cold seal glue may be applied to the bag allowing the end of the bag to be sealed after the food article has been placed therein. Areas 2B and 2C, of FIG. 2 indicate one manner of applying cold seal glue in order to ensure that all surfaces have been sealed thereby improving heat retention and thus holding time of the food article. Areas 2D and 2E represent an alternative sealing means which can be used by making a preliminary fold to close the bag and then by making a second fold to seal the area of glue 2E on the bottom panel of the bag to the glue area 2D on the top panel of the bag. By providing glue only in the areas 2D and 2E, the bag may be sealed without the use of glue on any interior surface, thus assuring that no contact occurs between the food article and the glue. Alternative locations and shapes for the glue areas are within the skill of the artisan and would likewise provide a sufficient seal to provide the necessary heat retention. In an alternative embodiment, sealing of the bag may be accomplished by simple folding without the use of adhesives.

Figure 3:
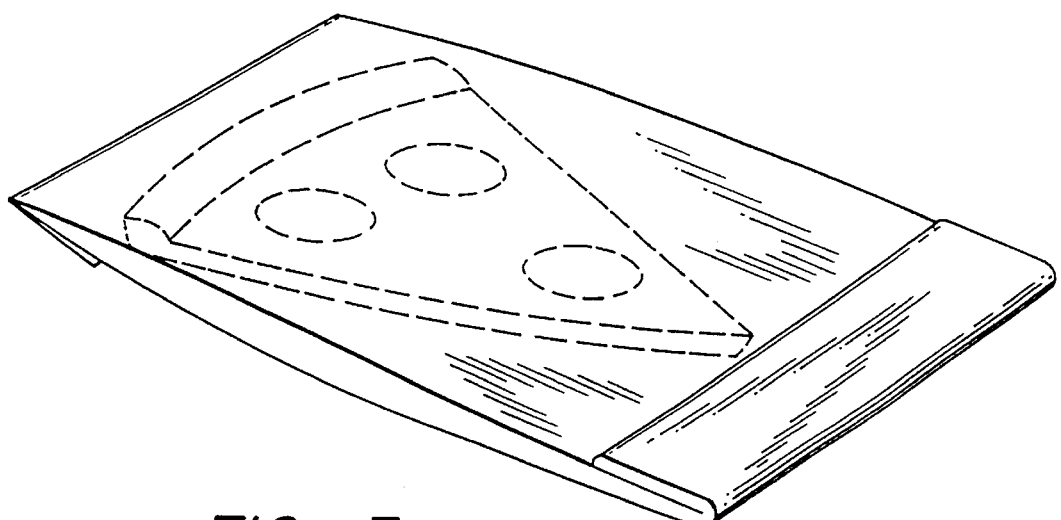
FIG. 3 illustrates a closed perforated bag containing foodstuff.

FIG. 3 illustrates the sealed bag having a food article therein. When the food article is to be consumed, the end seal 3A can be broken and the top panel drawn back as illustrated in FIG. 4. 4A represents the flap which is produced upon the drawing back of the top panel. If the flap 4A were drawn back completely, the interior surface of he bag 4B provides a sanitary surface upon which to place the food item. The underside of flap 4A may be used for condiments such as ketchup to dip French fries.

FIG. 5 illustrates the use of the bag according to the present invention for containing larger articles such as a whole pizza. The pizza which is contained on a tray can be conveniently exposed merely by drawing back the top panel 5A of the bag.

Figure 6:
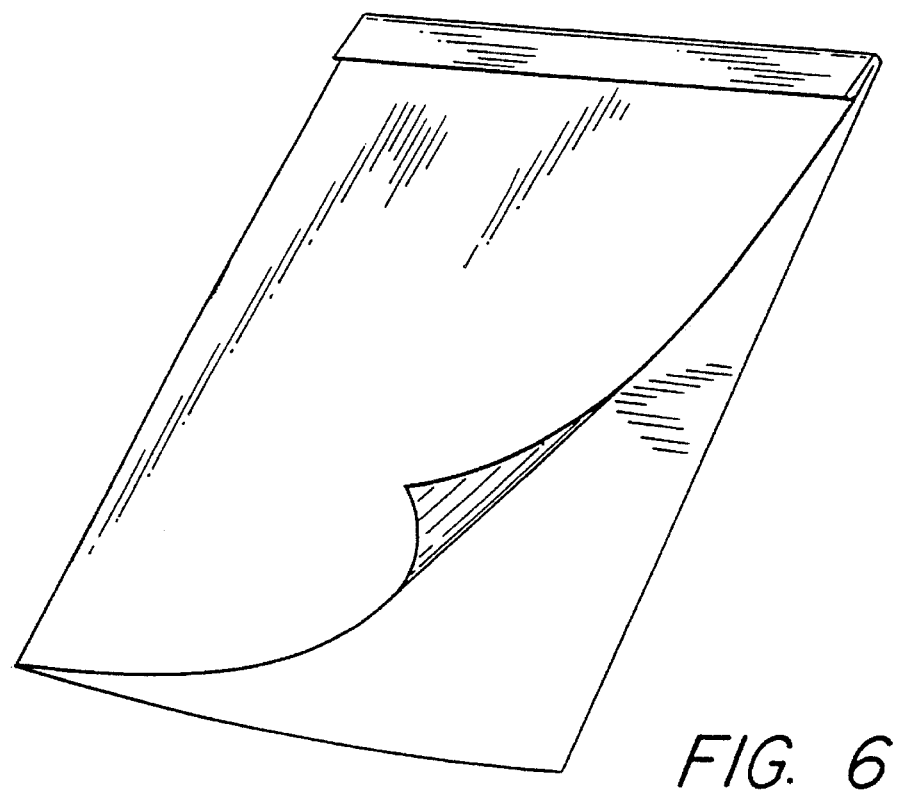
FIG. 6 illustrates a pouch having two adjacent open sides ready to recieve foodstuff.

FIG. 6 illustrates a pouch, in an open condition, having two adjacent open sides and two sides forming a pocket.

In one embodiment of the present invention, the perforated bag is made from a 3-ply integral composite material. The integral composite material has three layers—a first absorbent layer a second printable layer and a water vapor impermeable, polymer layer interposed between the first and second layers. The first and second layers are discontinuously, or spot bonded respective opposite sides of the layer which is interposed therebetween to form air pockets.

One side of the absorbent layer is placed adjacent to the hot foodstuff. On the other side of the absorbent layer is the impermeable polymer layer. The absorbent layer absorbs water vapor from the hot foodstuff which has passed through it and has condensed on the impermeable polymer layer, as well as any grease which may be present. As embodied herein, the absorbent layer preferably has good fold retention with a basis weight ranging from 5 to 50 lbs/3,000 sq. ft., and more preferably ranging from 10 to 20 lbs/3,000 sq. ft. The basis weight of the absorbent layer must be such that it can absorb all the water vapor lost by the hot sandwich and condensed on the impermeable layer.

The printable layer is positioned adjacent to the side of the impermeable polymer layer away from the hot foodstuff and is used for printing of identifying symbols, marks, labels or other indicia of source. The printable layer preferably has good fold retention with a basis weight ranging from 10 to 50 lbs/3,000 sq. ft., and more preferably ranging from 10 to 25 lbs/3,000 sq. ft. The printable layer may be any material having a printable surface, such as a coated paper. Typically, one surface of the printable layer has a smoother, glazed surface. Materials capable of use as the printable layer may be selected from the group of materials consisting of machine glazed papers, machine finished papers and coated papers.

The densities of the printable layer and absorbent layers of the composite wrap may be varied to control the heat flux through the composite wrap and the absorbency of the absorbent layer. When the absorbent layer has a high density the radiation of heat away from the hot foodstuff is minimized because the absorbent layer reflects and attenuates the radiant heat energy given off by the sandwich. The lower density printable layer has a low thermal conductivity which, in combination with the air pockets, reduces heat transfer from the higher density layer to the environment.

The impermeable layer is interposed between the first and second layers, respectively. The layer acts as an impermeable barrier to prevent both grease penetration and water vapor penetration from the hot foodstuff to the outside of the composite wrap material. In effect, the layer acts as a condensation surface for the water vapor. The absorbent layer then absorbs the condensate and grease to keep the hot foodstuff from becoming soggy and unpalatable. More importantly, by preventing the passage of water vapor, the layer facilitates heat retention by the hot foodstuff by retaining the heat from the condensed vapor within the package. By condensing the water vapor lost by the hot sandwich, the heat in that vapor is recovered within the sandwich wrap. This recovered heat minimizes subsequent heat loss by the sandwich, thereby maximizing sandwich temperature during holding. By preventing the passage of grease, the layer also helps to prevent unsightly grease stains on the outside of the composite wrap material.

Impermeable polymers useful in accordance with this embodiment of the invention include any extrudable material which can act as a complete barrier, e.g., is impermeable to water vapor and grease, such as polyethylene. Polymer materials useful in accordance with the invention are preferably selected from the group consisting of wax, wax/polymer blends, polyethylene, polyvinylidene chloride, ethylene acrylic acid copolymer, polypropylene, polyester, polyisobutylene, nylon, polymethylpentene, ethylene vinyl acetate and hot melts.

As further embodied herein, the polymer material may be pigmented. This pigmentation serves to give color or opacity to the polymer material to mask stains created by the grease and condensate absorbed by the absorbent layer, as well as any grease or condensation which may be present on the layer. The opaque quality of the polymer material helps to improve the aesthetic qualities of the wrapped food product by masking any grease and water stains.

Pigments which may be mixed with the polymer material to provide opacity include any metallic oxide pigments and any organic dye colorants. Pigments useful in accordance with this embodiment of the invention are preferably selected from the group consisting of titanium dioxide, calcium carbonate and zinc oxide.

The pigments can be mixed with the polymer material according to any well known method prior to extruding or forming the pigmented polymer layer.

More particularly, there may be a plurality of air pockets formed on at least one side of the impermeable polymer layer between discontinuous or spot bonded portions of the absorbent layer and printable layer adjacent the respective opposite sides of the layer. The air pockets serve to insulate the hot foodstuff item by improving heat retention by decreasing conductive heat transfer.

The air pockets may have a variety of shapes or pattern configurations; no one shape or pattern is preferred. The size and shape of the air pockets can be determined by aesthetic considerations. In general, the individual air pockets have a surface area ranging from 0.5 in$^2$ to 3.5 in$^2$.

The size of the air pocket is limited, for example, by the pattern depth of the roll during production of the wrap material, the temperature of the extrudate during production and the amount of compression that the composite wrap will be subjected to during packing or storage.

For illustration purposes, the spot bonding can create a rectangular pattern in the wrap material. In one embodiment, none of the individual spot bonds are connected, resulting in a pattern whereby all of the air pockets are interconnected. Thus, the air contained in any individual pocket can move throughout the composite wrap material. This allows for the maximum amount of air to be trapped between the layers of the composite wrap while minimizing the chance of popping or blowing holes in any of the three layers when the finished composite wrap is tightly compressed during packing or storage. Spot bonding includes glue bonding (using for example, adhesives such as glue, solvent based adhesives, hot melts, wax and 100% solid adhesives), extrusion bonding, ultrasonic weld bonding and the like.

Further there is disclosed a method of manufacturing the 3-ply, composite wrap material by extrusion lamination. One preferred method will be described in detail below.

An impermeable pigmented polymer extrudate, which when chilled sets to form the impermeable polymer layer, is conveyed towards a pair of nip rolls. The extrudate may be formed and conveyed by any known method.

The extrudate is generally at a temperature in the range of 450° to 600° F., and more preferably 500° to 550° F. prior to contact with at least one of the nip rollers. In some applications, temperatures ranging up to about 650° F. may be advantageous.

Because the layer is impermeable, the extrudate must be extruded as a pinhole free film at a thickness sufficient to be able, when cooled, to form an impermeable barrier. Although some pinholing may occur as a result of paper fibers penetrating through the polymer film when the polymer film contacts the other two layers, the amount of pinholing must be minimized to reduce water vapor loss, and hence heat loss.

The first and second layers, are directed by any well known means into an adjacent, non-contact position with the extrudate on its respective opposite sides prior to passing through the nip rolls. The layers contact for the first time as they pass through nip rolls to form a three-layered material.

In accordance with this embodiment of the invention, at least one of the rollers is cooled to a temperature sufficient to cool and set the extrudate when it indirectly contacts the roller through either the absorbent layer or printable layer to form the impermeable polymer layer. Typically, the smooth surfaced roller is the roller whose surface temperature is controlled by any well known means. The temperature of the roller can vary according to the temperature of the extrudate and expected time of contact. Either the absorbent layer or printable layer may be on the side directly contacting the chilled roller.

At a time simultaneous with the cooling and setting of the extrudate on the roller to form the impermeable layer, the second roller is acting in physical engagement with the three-layered material to discontinuously bond or laminate the first and second layers with the respective opposite sides of the polymer layer interposed therebetween.

In accordance with the invention, the surface of one roller has a series of raised protrusions spaced around the periphery. The surface of a raised protrusion physically engages the first, second and extrudate layers against the surface of roller to discontinuously bond or laminate the three layers at a point and thereby form air pockets on both sides of the then formed impermeable polymer layer between the respective sides of the impermeable polymer layer and the first absorbent and second printable layers.

The size and shape of the air pockets are determined by the size and shape of the protrusions. The protrusions can be any shape or size with the limitations regarding air pockets size specified above and the height limitations given below constituting preferred limitations for the reasons given.

The height of the protrusions is in the range of 0.03 to 3.00 inches, more preferably about 0.045 inches. If the protrusions are less than 0.03 inches, the air pockets will be small as defined by this product. And if the protrusions are greater than 0.07 inches, then the air pockets will be too large and the composite wrap may pop open when compressed.

When it is desirable, or specified, that air pockets may be formed on only one side of the composite wrap, the polymer layer and one other layer are first extrusion coated, laminated, including glue lamination (using for example, adhesives such as glue, solvent based adhesives, hot melts, wax and 100% solid adhesives), extrusion lamination, ultrasonic weld lamination and the like or wax coated to form a first composite having a continuous bond formed between the two respective adjacent surfaces. The composite layer thus formed is then contacted with the other layer (absorbent or printable) as they pass through nip rollers as before. In this case, however, because the first composite has already been formed so that a continuous bond is formed between the two surfaces, at least one of the nip rollers must be heated to affect bonding between the last layer and the preformed composite. Temperatures suitable for this bonding will be determined by the type of materials used in the first composite, and are readily determined by a skilled artisan.

In still another preferred embodiment, the composite wrap material may be formed by a lamination process in which the extrudate is replaced by a preformed film. The preformed film is then contacted with the other layers as before. In this embodiment, at least one of the nip rolls must also be heated to affect bonding between the layers. Temperatures suitable for this bonding will be determined by the type of preformed material, and are readily determined by a skilled artisan.

A second embodiment of the invention is directed to a perforated bag made from a 3-ply composite wrap material having three layers: a first absorbent layer containing fibers bearing a foraminous hydrophobic water-vapor-permeable pellicle; a second printable layer; and a water-vapor-impermeable polymer layer interposed between the first and second layers. In a more preferred embodiment, at least a portion of the layer of absorbent material also comprises the reaction product of in-situ crosslinking of a water soluble polymer, said reaction product being water insoluble and exhibiting a water-retention capacity of at least about 10 grams of water per gram ("g/g") of reaction product, preferably over about 25 g/g and more preferably over about 50 g/g. The amount of reaction product present on an area basis being sufficient to absorb at least about 0.001, preferably 0.002, more preferably 0.0025 grams of water per square centimeter, and still more preferably over 0.005 g/cm$^2$. The total amount of reaction product in a one square foot sheet being sufficient to absorb at least 1 gram of water, preferably at least about 1.5 grams, more preferably over 2 grams, and in the most preferred embodiments, at least 3 grams of water.

This 3-ply wrap material is made of a first, absorbent layer, a second, printable layer, and an impermeable polymer layer interposed between the first absorbent layer and the second printable layer. The first layer and the second layer are discontinuously, or spot, bonded to the respective opposite sides of the impermeable layer which is interposed therebetween to form air pockets. Fibers in the first absorbent layer bear foraminous hydrophobic water-vapor-permeable pellicles formed by spreading hydrophobe-precursor over fibers in the absorbent layer and thereafter converting the precursor to foraminous hydrophobic water-vapor-permeable pellicles on the fibers, usually by removal of the aqueous carrier. The pellicle is applied to at least fibers adjacent to the surface of the absorbent layer opposite the water-vapor-impermeable layer and adjacent to the hot foodstuff.

On the other side of the absorbent layer is an impermeable polymer layer. After water vapor passes into the absorbent layer, it appears that it either condenses on the impermeable polymer layer and is trapped adjacent thereto or that some portion of the vapor and, possibly, the condensed water, enters fibers in the absorbent layer through the pellicle and is absorbed there. Surprisingly, even if substantially all of the fibers in the absorbent layer are treated, the wrap continues to have the ability to retain or absorb moisture from the hot foodstuff, as well as any grease which may be present. The pellicle may be present on fibers in a distinct sublayer or it may be present as a film, coating or crust on at least some, and surprisingly even possibly all, of the fibers in the absorbent layer. Surprisingly, the absorbent layer is capable of retaining substantial amounts of moisture, even if the hydrophobe precursor penetrates the absorbent layer to such a depth that both surfaces thereof are rendered hydrophobic. It is not known whether moisture may be predominately trapped between the impermeable film and the absorbent layer or whether it is absorbed within individual fibers in the absorbent layer. Preliminary indications are that some moisture is probably retained by each mechanism for, when a sheet is exposed to steam and subsequently delaminated, the absorbent layer assumes a more highly translucent character which is deemed to be an indication that moisture has been absorbed by individual fibers while residual droplets of water can be seen on the impermeable film.

The absorbent layer has both good fold retention and good water retention capacity. The basis weight preferably ranges from 5 to 50 lbs/3,000 sq. ft., and more preferably from 10 to 20 lbs/3,000 sq. ft. To avoid sogginess, the basis weight and water retention capacity of the absorbent layer should be such that it can retain virtually all the water vapor expected to be lost by the hot sandwich and condensed on the impermeable layer during the anticipated holding period. In a more preferred embodiment of this composite material, at least a portion of the absorbent layer includes absorbent material comprising the reaction product of in-situ crosslinking of an absorbent water soluble polymer, said reaction product being water insoluble and exhibiting a water-retention capacity of at least about 10 grams of water per gram of reaction product, preferably over 25 g/g and, more preferably, over 50 g/g. The amount of reaction product present on an area basis being sufficient to absorb at least about 0.001 grams of water per square centimeter, more preferably over 0.0025 g/cm$^2$ and most preferably over 0.005 g/cm$^2$. The total amount of reaction product in a one square foot sheet being sufficient to absorb at least 1 gram of water, preferably over 1.5 grams, more preferably, over 2 grams and, in the most preferred embodiments, at least 3 but no more than about 5 grams of water. The absorbent layer may be almost entirely comprised of reaction product, save only a sublayer comprising fibers bearing thin foraminous hydrophobic water-vapor-permeable pellicles present on the surface of individual fibers in the sublayer; or alternatively, reaction product may be dispersed through the absorbent layer and separated from the foodstuff by a layer of more conventional absorbent material comprising cellulosic fibers having a water retention capability of less than about 0.1 grams of water per gram of fiber. Alternatively, the reaction product may be present as a distinct sublayer, interior to portions of the wrap comprising both fiber bearing pellicles and fibers without. Reaction product may also be present in a pattern conforming to expected locations of moisture evolution in a wrapped foodstuff.

According to a preferred embodiment of this composite material, the absorbent layer comprises a layer of material comprising two sublayers, the first sublayer comprised primarily of cellulosic fibers rendered hydrophobic by application of a hydrophobe precursor and the other sublayer comprising primarily absorbent material comprising the reaction product of in-situ crosslinking of absorbent water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in a one square foot sheet being sufficient to absorb at least 1 gram of water. Materials for use as the first absorbent sublayer are preferably selected from the group of cellulosic materials consisting of nonwoven tissue, air laid fabric, wet laid tissue, wet or dry creped tissue and embossed papers, treated as described below.

Coupling highly absorbent material in the sublayer with the impermeable layer makes it possible to retain foodstuffs in palatable condition at acceptable serving temperature for considerably longer periods, often several minutes longer, than with composite wraps not incorporating highly absorbent materials. The sublayer is preferably spaced away from the hot foodstuff to prevent direct contact therewith. The separation may be provided by a layer of paper having a water holding capacity of less than 1 g/g or, more advantageously, by another distinct sublayer which comprises fibers bearing hydrophobic pellicles. The combination of the two sublayers provides improved retention of appearance of the sandwich especially providing appetizing presentation even after rather prolonged storage.

Perhaps the most convenient method of forming the foraminous hydrophobic water-vapor-permeable pellicle is to simply spread a very thin, superficial interspersion of a hydrophobe precursor over a paper sheet in an amount small enough to avoid formation of a continuous film but large enough to prevent penetration of the sheet by droplets of water. In a very broad sense, coating materials that provide a low surface energy surface and do not form continuous films are useful release coatings for hot foodstuffs packaging applications. Typically, upon conversion, suitable hydrophobe precursor materials will produce a porous or microporous hydropobic surface having a surface energy of less than 35 dynes/cm when applied to fibers on the surface of the inner absorbent layer. Included in this category are, for example, silicones, fluorocarbons, waxes, and fatty acids. The foraminous nature of the pellicle seems to possibly stem from a variety of causes: from porosity in the layer of hydrophobe formed on the individual fibers; from gaps between fibers; from incomplete contact between the surface of the fiber and the hydrophobe; or combinations of these. Usually, the hydrophobe will be applied so sparingly that gaps between fibers are not bridged over by the hydrophobe. Preferably, the hydrophobe precursor is applied as an aqueous admixture prior to provision of the highly absorbent material to avoid the requirement of removing water from the highly absorbent material. Preferably, the sequence of steps will provide for formation of the highly absorbent material by in-situ crosslinking only after all other significant drying procedures are substantially complete.

Broadly speaking, a hydrophobe precursor may be any organic material combining a site reactive toward starch or cellulose with a long hydrophobic tail such as, for example, a $C_{14}$–$C_{18}$ carbon chain length tail. Materials like fatty acids, fatty acid amides, and fatty alcohols fall into this category. Suitably reactive natural and synthetic polymeric materials with pendant hydrocarbon groups along their backbone will also provide the necessary hydrophobicity. Hydrophobically modified starches and latices are examples of this group of materials. Hydrophobically modified polyvinyl acetate with a short hydrocarbon tail also can provide release under many circumstances.

Precursors can be any material having long chain molecules bearing pendant groups like methyl, trifluoromethyl, or difluoromethyl along its backbone providing low surface energy and, consequently, a level of release sufficient for this application. A more comprehensive list of pendant groups and their effect on surface energy are shown below:

| Pendant Group | Surface Energy (dynes/cm$^2$) |
|---|---|
| —CF$_3$ | 6 |
| —CF$_2$H | 15 |
| —CF$_3$ and —CF$_2$— | 17 |
| —CF$_2$— | 18 |
| —CH$_2$—CF$_3$ | 20 |
| —CF$_2$—CFH— | 22 |
| —CF$_2$—CH$_2$ | 25 |
| —CFH—CH$_2$ | 28 |
| —CH$_3$ | 22 |

Typical hydrophobe precursors will have a structure represented as:

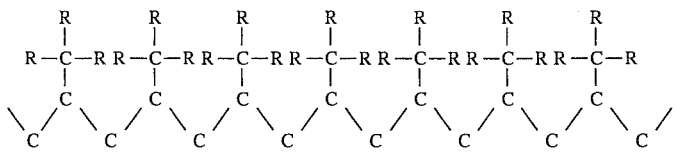

where R is selected from the following: hydrogen, alkyl groups, halogenated alkyl groups and halogens or a combination thereof.

Preferred hydrophobe precursors will have structures represented as structures I–III below:

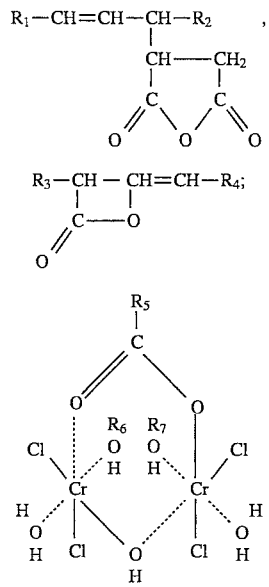

wherein $R_{1-5}$ are long chain ($C_{12+}$) alkyl groups, and $R_6$ and $R_7$ are lower ($C_{1-4}$) alkyl groups. Preferably, $R_{1-5}$ are at least $C_{16}$ groups while $R_{6-7}$ are methyl, ethyl or propyl groups. More preferably, $R_{1-2}$ are $C_{18}$ groups, $R_{3-4}$ are $C_{16-18}$ groups, $R_5$ is $C_{18-19}$ and $R_{6-7}$ are propyl groups. The preferred hydrophobe precursors include: alkyl ketene dimers (AKD's) such as Hercon 70 from Hercules, Inc.; alkenyl succinicanhydride (ASA), from American Cyanamid and Quilon, a Werner complex from du Pont. These precursors are morphologicaly similar but react with carbohydrates like starch and cellulose in a different way. Hercon 70, for example, seems to become substantive through a lactone ring opening reaction, while the alkenyl succinic anhydride appears to become substantive via an anhydride opening reaction. Quilon is thought to become substantive by a Werner Chrome complex reaction mechanism. Each of the more preferred materials have a $C_{14}$–$C_{18}$ carbon length tail providing hydrophobicity and release. Orientation of these hydrocarbon tails toward the air interface is thought to provide the low surface energy and release behavior.

The most preferred release coatings for a hot food wrap provide easy release, breathability, and low cost. These coatings can be thought of as abhesives as they prevent sticky adhesive-like materials from bonding to the surface to which they are applied. Alkyl ketene dimers (AKD's) such as Heron 70 from Hercules Inc. are the most preferred precursors providing excellent release performance. This material can be incorporated into a size press formulation along with a starch like Penford 250, a viscosifier like Kelgin MV, and a defoamer like Nalco 8669, then applied on a paper machine size press at 4.5% solids, yielding a breathable foraminous water-vapor-permeable hydrophobic surface with only 0.25 lb/3,000 ft$^2$ ream of coat weight. This hydrophobic surface treatment augments release while also providing the required vapor permeability to allow free movement of water vapor through it. Further, being a hydrophobe, this coating inhibits redeposition of condensed water onto the hot sandwich.

These formulations can be applied using any of the numerous conventional coating equipment encountered in the paper industry, for example: the size press on a paper machine, an on-line coater, or an off-line coater, and the like. For most applications, an on-line operation will, of course, be preferred if equipment and space permit, but any of the coating operations described can be successfully used. The design of the size press is not critical to performance so it can be of a horizontal, vertical, or inclined configuration. A metering size press of any of the well-known designs also will provide acceptable performance. An on-line coater of a common design known to those skilled in the art capable of handling the above formulations also can be used. Off-line coaters, while possibly not economically as attractive as an on-line coater for many applications, will provide acceptable performance. Any of the common designs, such as rod, gravure, knife, and the like, can be used. A specific example of a size press formulation that successfully provides the functions described above is shown as Example 1:

| Example | |
| --- | --- |
| Penford 250 | 88 lb |
| Kelgin MV | 6 lb |
| Hercon 70 | 6 lb |
| Water | 2122 lb |

Other useful formulations are shown as Examples 2 and 3.

| Example 2 | |
| --- | --- |
| National 78-1725 | 74.5 lb |
| Kelgin MW | 10.0 lb |
| Hercon 70 | 75.5 lb |
| Water | 2841.0 lb |
| Example 3 | |
| Penford 260 | 78.2 lb |
| Kelgin MW | 6.3 lb |
| Hercon 70 | 15.5 lb |
| Water | 1567.0 lb |

If problems with excessive slip are experienced, such as those leading to "telescoping", up to about 10 to 15% by weight of mineral fillers such as $CaCO_3$, silica, talc or calcined clay may be added to control friction. If the amount of moisture evolved by a sandwich exceeds the capacity of the wrap to retain moisture, the sheet can become soggy and provide an undesirably wet surface against the sandwich. Even though the previously mentioned composites are capable of retaining considerably over a gram of water, not all of this moisture is physically absorbed by the absorbent layer which can usually absorb less than its weight in moisture, so a typical square 12" 10¾ lb. sheet[1/] could allow moisture to undesirably be transferred back to the bun, or otherwise provide a less than ideal surface for contact with bread before even a full gram of moisture was evolved from the sandwich. We have found that a sandwich containing only four ounces of typical hamburger will often evolve over two grams of water during a prolonged holding time. Such large amounts of water vapor condensed on the barrier layer can saturate a 10¾ lb inner layer and surpass the ability of the wrap to retain moisture allowing redeposition of water on the sandwich, resulting, in some cases, in a less attractive presentation or, in extreme cases, in a soggy and unpalatable bun. Thus, by incorporating a highly absorbent material into the inner absorbent layer, we can provide for satisfactory presentation over retention times increased beyond that of previous composite wraps. Absorbency of the inner ply of a multilayer paper-based hot sandwich wrap is enhanced by incorporating highly absorbent materials into the absorbent layer in order to enhance the water-holding properties of the hot sandwich wrap. The most preferred highly absorbent materials are those that are created in-situ by crosslinking absorbent water-soluble polymers. Such a system can be made by incompletely crosslinking almost any water soluble carboxyl-group-containing polymer to such a degree that it becomes insoluble but numerous carboxyl groups remain unreacted. The specific chemistries usable in formation of such highly absorbent materials are well known and those preferred for use herein may be summarized as follows:

[1]/ (Throughout this specification, where the weight of a sheet is set forth in pounds, it is to be understood that weight is the weight of a 3,000 square foot ream).

Suitable highly absorbent materials comprise an ionic complex of two essential ingredients: a water-soluble anionic polyelectrolyte, and a polyvalent metal cation. The polyelectrolyte can be a natural or synthetic polymer characterized by substantial water-solubility in an aqueous medium of some relatively neutral pH (somewhere from 2.0 to 8.5 pH) and by the presence of anionic groups (preferably carboxyl, sulfonate, sulfate or phosphate anionic groups). The preferred natural polymers are the anionic derivatives of starch or cellulose, and the preferred synthetic polymers are the carboxylic acid homopolymers or copolymers containing at least 20 mole percent carboxylic acid units, e.g., polyacrylic acid.

Exemplary of the carboxylic acid-containing polyelectrolytes are the synthetic copolymers of ethylenically unsaturated monomers with mono-ethylenically unsaturated carboxylic acids or their partially neutralized salts. Examples of the preferred α,β-mono-unsaturated carboxylic acids include acrylic acid, methacrylic acid, maleic acid, maleic anhydride, itaconic acid, itaconic anhydride, fumaric acid, half esters or half amides of maleic, fumaric and itaconic acid, crotonic acid, etc. Examples of the preferred α,β-ethylenically unsaturated monomers include acrylamide or methacrylamide and their N and N,N dialkyl derivatives containing 1–18 carbon alkyl groups, alkyl acrylates and methacrylates containing 1–18 carbon alkyl groups, vinyl esters, vinyl aromatic compounds, dienes, etc.

Homopolymers of monoethylenically unsaturated carboxylic acids or mixtures of these monomers may also be used. Examples include acrylic and methacrylic acid homopolymers and acrylic acid/methacrylic acid copolymers.

Exemplary of the sulfonic acid-containing polyelectrolytes are the homopolymers of monoethylenically unsaturated sulfonic acids (or salts thereof) and copolymers thereof with the aforementioned ethylenically unsaturated monomers. Suitable sulfonate-containing monomers include aromatic sulfonic acids (such as styrene sulfonic acids, 2-vinyl-3-bromobenzenesulfonic acid, 2-vinyl-4-ethylbenzenesulfonic acid, 2-allylbenzene sulfonic acid, vinylphenylmethane-sulfonic acid and 1-sulfo-3-vinylphenylmethane sulfonic acid), heterocyclic sulfonic acids (such as 2-sulfo-4-vinylfurane and 2-sulfo-5-allylfurane), aliphatic sulfonic acids (such as ethylenesulfonic acid and 1-phenylethylene sulfonic acid), sulfonic acids containing more than a single acid radical (such as α-sulfoacrylic acid and α-sulfoethylene-sulfonic acid), and sulfonic acid derivatives hydrolizable to the acid form (such as alkenyl sulfonic acid compounds and sulfoalkylacrylate compounds).

Exemplary of the sulfate-containing polyelectrolytes are those formed by reacting homopolymers and copolymers containing hydroxyl groups or residual polymer unsaturation with sulfur trioxide or sulfuric acid; for example, sulfated polyvinyl alcohol, sulfated hydroxyethyl acrylate, sulfated hydroxypropyl methacryulate. Exemplary of the phosphate-containing polyelectrolytes are the homopolymers and copolymers of ethylenically unsaturated monomers containing a phosphoric acid moiety, such as methacryloxy ethyl phosphate.

Exemplary of the poly-electrolytes formed of natural polymers and their derivatives are the carboxylated, sulfonated, sulfated, and phosphated derivatives of cellulose and starch, such as carboxymethyl cellulose and carboxymethyl starch. Naturally occurring anionic poly-electrolytes such as alginates, carrageenen, proteins (such as gelatin, casein, and soya protein), gum arabic, algin, agar, gum ghatti also have utility.

The polymers may be prepared by conventional polymerization techniques, such as solution, emulsion, suspension, and precipitation polymerization techniques. While the polymers are preferably prepared using a free radical polymerization mechanism, other polymerization mechanisms, including anionic and cationic mechanisms, may be used.

The poly-electrolyte generally has a molecular weight of from 10,000 to 10,000,000. Absorbency of the composition is improved when the poly-electrolyte is at higher molecular weight levels within the specified range. Accordingly, various difunctional monomers such as allyl methacrylate may be used to chain extend the poly-electrolyte prior to exposure to the cation. The amount of chain extender used must, of course, not render the polyelectrolyte insoluble in aqueous media. The increased chain length of the poly-electrolyte permits lower cation crosslinker levels to be employed as there are fewer polymer chains to be complexed.

Absorbency of the composition is improved when the poly-electrolyte has up to about 95%, preferably 40–85% of its anionic groups neutralized with a suitable base such as an alkali metal hydroxide, a primary, secondary or tertiary amine, etc. The neutralization is thought to uncoil and straighten out the polymer chains in contact with water so that the final complex is more swellable in the presence of water.

Polyvalent metal cations complex the above described polyelectrolyte to render the overall polymer composite substantially insoluble yet highly swellable. The cations have a valence of at least three and are cations of metals belonging to the following groups of the periodic table: IIIB, IVB, VB, VIB, VIIB, VIII, IIIA, IVA, VA, VIA. The preferred metals are aluminum, zirconium, chromium, titanium and iron, and to a lesser degree antimony and bismuth. More preferred metals are zirconium, aluminum, iron, titanium and mixtures thereof. For our purposes, zirconium is an especially preferred metal.

The metal compound can be added prior to, during polymerization or post-added to a polymeric poly-electrolyte solution, the only restraint being that the metal compound be at least ionizable or soluble in the polymer system. The polyvalent metal can be added to the composition by means of a basic, acidic or neutral salt, hydroxide, oxide or other compound or complex which has at least limited solubility in water or an organic solvent in which the poly-electrolyte and/or its constituent monomers are also soluble at the time of cation introduction.

Examples of inorganic salts include chlorides, nitrates, sulfates, borates, bromides, iodines, fluorides, nitrites, perchlorates, phosphates, and sulfides, such as aluminum chloride, aluminum sulfate, ferric sulfate, ferric nitrate, antimony trichloride, bismuth chloride, zirconium chloride, chromic sulfate, and chromic nitrate. Examples of organic 'salts include salts of carboxylic acids such as carbonates, formates, acetates, butyrates, hexanoates, adipates, citrates, lactates, oxalates, oleates, propionates, salicylates, glycinates, glycollates and tartrates; for example, aluminum formoacetate, basic aluminum acetate, chromic acetate, aluminum citrate, aluminum diformate, aluminum triformate, titanium oxalate, ferric acetate, aluminum octate, ferric oleate, zirconium lactate and zirconium acetate.

The ammonia and amine complexes (and especially those coordinated with ammonia) of these metals are particularly useful. Amines capable of so complexing include morpholine, monoethanol amine, diethylaminoethanol and ethylenediamine. Examples of these amine complexes include ammonium zirconyl carbonate, ammonium zirconyl glycinate, and ammonium zirconium chelate of nitrilotriacetic acid. Polyvalent metal complexes (salts) of organic acids that are cable of solubilization in an alkaline pH range may also be employed. Such anions as acetate, glutamate, formate, carbonate, salicylate, glycollate, octoate, benzoate, gluconate, oxalate and lactate are satisfactory. Polyvalent metal chelates wherein the ligand is a bidentate amino acid, such as glycine or alanine, are particularly useful.

Other organic compounds containing polyvalent metals are also useful; for example, the metal alkoxides, metal alkyls, and acetyl acetonates, such as aluminum isopropoxide, titanium acetyl acetonate, aluminum acetyl acetonate, chromic acetyl acetonate, zirconium ethoxide, chromic isobutoxide and triethyl aluminum.

The cations of one or more of such metals are present in the highly absorbent material at a level of 0.01–5.0 milliequivalents of cation per gram of poly-electrolyte, and preferably 0.1–1.0 milliequivalents of cation per gram of poly-electrolyte. Lower cation levels do not render the polymeric composition water-insoluble, while higher cation levels render the polymer composition not only water-insoluble, but also non-swellable.

Lower cation levels within the range are especially effective when the poly-electrolyte is of relatively high molecular weight. Regardless of pH, higher cation levels within the specified range contribute to the permanency of the gel formed by exposure of the dried complex to the fluid to be absorbed; but it is noted that, in this application a gel life of only a fraction of an hour, typically well under 45 minutes, is required and hence lower cations levels within the specified range may be suitable. In general, the optimum cation level varies with the ion size of the cation.

Not all of the available ionic linkages of a given polyvalent cation will necessarily be associated with different poly-electrolyte polymeric chains, especially in the case of the cations such as zirconium, having valence or oxidation states greater than 3, inner salt formation (that is, the attachment of a single cation exclusively to a single-polymer chain or to a number of polymer chains less than the valence) will occur to an unspecified degree dependent on the spatial geometries presented by the reagents involved, relative concentrations, etc. Light-to-moderate complexing of the water soluble poly-electrolyte renders the material water insoluble, but water-swellable. In the presence of a quantity of water, the highly absorbent material becomes a gelatinous agglomerate of liquid-swollen particulate members. The material is capable of absorbing at least 10 times its weight in water, and generally at least 20 times its weight. Furthermore, the composition is capable of retaining the absorbed water even when exposed to pressure sufficient to deform the agglomerate, and generally up to pressures of about 2.5 psi, such as would be encountered in a wrapped sandwich.

The poly-electrolytes used in practice of the present invention should be substantially water-soluble at some pH between 2.0 and 8.5 to utilize the metal complexing and form the desired water-insoluble absorbent complex. However, the reversibility of ionic complexing (as opposed to covalent bonding) is well known in the chemical art and once the pH of the complex is raised above a certain level (i.e., the pH of reversibility), the complex breaks down, yielding again the water-soluble non-absorbent poly-electrolyte. This reversibility of complex formation facilitates easy and economical application of the complex onto a desired substrate by use of conventional fluid application techniques as described above with relation to application of the hydrophobe precursor. Prior to application, a suitable quantity of a base is added to the complex to cause dissolution thereof into a solution containing the cation and the water-soluble poly-electrolyte thereof, and subsequent to application, an acid is added to the solution to cause reformation of the absorbent complex. In a preferred technique, a volatile base (such as ammonium hydroxide) is employed to break the complex so that mere drying of the solution suffices to lower the pH and hence cause reformation of the absorbent complex without the addition of an acid. The acid strength of the polyelectrolyte acid has a marked effect upon the pH of reversibility. The higher the acid strength (i.e., the lower the pH of dissociation), the lower the pH of reversibility. For example, polyacrylic acid, a weak polymeric acid, reverses its complex at pH 8.5–9.0; whereas styrene sulfonic acid, a very strong polymeric acid, reverses its complex at a pH of about 3.5–5.0.

We particularly prefer partially pre-neutralized polyacrylic acid cross-linked with ammonium zirconium carbonate. Systems made in this fashion offer a wide range of absorbency depending on the amount of pre-neutralization with base, such as sodium hydroxide. A major advantage of these systems is that they do not become highly absorbent until they are dried. This eliminates the high thermal energy needed to dry water out of highly absorbent materials. In accordance with pending U.S. application Ser. No. 07/635,378, incorporated herein by reference, polyhydroxylates such as polysaccharides, sugars, particularly sucrose, monosaccharides, as well as polyvinyl alcohol can be used as extenders for the highly absorbent material. As mentioned previously, it is extremely advantageous to postpone conversion of these materials to the highly absorbent form until after the hydrophobe precursor, if used, is dried and other drying steps have been completed.

A description of the specific formulation is shown in Example 4. As mentioned, the precursors for the highly absorbent materials to be formed in-situ can be applied by any convenient technique, such as spraying or coating, the method chosen being based on equipment availability, viscosity of the precursor containing admixture, and the amount required. A size press or coater can be used on the paper machine making the base sheet which is to become the inner absorbent layer. An off-line coater equipped with a gravure, rod, knife, or blade coating head can also be used successfully. The system can also be applied by spraying in-line with one of the converting steps. As an example, the precursor could be sprayed on the 10¾ lb/3,000 ft² web and dried in-line with the barrier extrusion lamination process. We have found that the polyacrylic acid salts are good adhesives and do not inhibit adhesion.

EXAMPLE 1

Acumer 1530 (237 pounds@25% solids, formerly marketed as Acrysol A-3, Rohm and Haas Corp.) was placed in a 55 gallon barrel. Dilution water (20 gallons) was added along with sodium hydroxide (16.5 pounds of solid pellets, added with stirring in two approximately equal portions over a four-hour period). After the sodium hydroxide had dissolved, ammonium hydroxide (15 pounds, approximately 34% ammonia in water) was added. After thorough mixing and after the mixture had cooled to room temperature, sodium bicarbonate (7.4 pounds, solid) was added cautiously with stirring. After the solids dissolved, ammonium hydroxide pound) and ammonium carbonate (2.0 pounds, solid) were added followed by ammonium zirconium carbonate (2.9 pounds of solution, nominally 20% solids, Magnesium Elektron Corp.).

TABLE 1

| Absorbent Classification Preferred Polyelectrolytes Raw Material | | |
|---|---|---|
| Starch-based | Cellulose-based | Synthetics (PAA) |
| Henkel: (Sold License) Grain Processing | Hercules: (Aqualon) | Arakawa: (Arasorb) |
| Sanyo Chem: (Sanwet) Celanese Licensee | J&J: (GCC) Grafted Cellulose Copolymers | Dow Chemical: (XU) Experimental |
| Avebe: (Foxsorb) Potato Starch | | American Colloid: (Aridall) |

Other highly absorbent materials can be created in-situ by selecting polymer and crosslinker systems as described in Ganslaw, U.S. Pat. No. 3,963,463, which is incorporated herein by reference. Conventional dry powder absorbents as shown in Table 1 can also be used even though these systems are somewhat more difficult to handle. For example, dry powder absorbents can be embedded between the absorbent layer and the impermeable layer using conventional technology.

According to one embodiment of the invention, there are a plurality of air pockets formed on at least one side of the impermeable polymer layer between discontinuous or spot bonded portions of the absorbent layer and the printable layer adjacent the respective sides of the impermeable layer. The air pockets serve to insulate the hot foodstuff item by improving heat retention by decreasing conductive heat transfer.

Air pockets may have a variety of shapes or pattern configurations; no one shape or pattern is preferred according to the present invention. The size and shape of air pockets can be determined by aesthetic considerations. In general, the individual air pockets have a surface area ranging from 0.5 in² to 3.5 in².

The size of the air pocket is limited, for example, by the pattern depth of the roll used during production, the temperature of extrudate during production and the amount of compression that the composite wrap will be subjected to during packing or storage.

None of the individual spot bonds need be connected, resulting in a pattern whereby all of air pockets are interconnected. Thus, the air contained in any individual pocket can move throughout the composite wrap material. This allows for an effective amount of air to be trapped between the layers of the composite wrap while reducing the chance of popping or blowing holes in any of the three layers when the finished composite wrap is tightly compressed during packing or storage.

The extrusion lamination process of making the 3-ply, composite wrap material is described as follows:

An impermeable pigmented polymer extrudate, which when chilled sets to form an impermeable polymer layer, is conveyed towards a pair of nip rolls. The extrudate may be formed and conveyed by any known method.

The extrudate is generally at a temperature in the range of about 450° to about 600° F., and more preferably, about 500° to 550° F. prior to contact with at least one of the nip rollers. In some applications, temperatures ranging up to about 650° F. may be advantageous.

Because the polymer layer is impermeable, the extrudate should be extruded as a pinhole free film at a thickness sufficient to be able, when cooled, to form an impermeable barrier. Although some pinholing may occur as a result of paper fibers penetrating through the polymer film when the polymer film contacts the absorbent and printable layers, the amount of pinholing should be minimized to reduce water vapor loss, and hence heat loss.

The first absorbent layer and the second printable layer, are directed by any well known means into an adjacent, non-contact position with the extrudate on its respective opposite sides prior to passing through the nip rolls. The layers contact for the first time as they pass through the nip rolls to form a three-layered material.

At least one of rollers is cooled to a temperature sufficient to cool and set the extrudate when it indirectly contacts the roller through either the absorbent layer or the printable layer to form the impermeable polymer layer. Typically, a smooth surfaced roller is the roller whose surface temperature is controlled by any well known means. The temperature of the controlled roller can vary according to the temperature of the extrudate and expected time of contact. According to the invention, either the absorbent layer or the printable layer may be on the side directly contacting the chilled roller.

At a time simultaneous with the cooling and setting of the extrudate on the chilled roller to form the impermeable polymer layer, the second roller is acting in physical engagement with the three-layered material to discontinuously bond or laminate the absorbent and printable layers with the respective opposite sides of the impermeable polymer layer interposed therebetween.

The surface of the second roller has a series of raised protrusions spaced around the periphery. The surface of a raised protrusion physically engages the first, second and extrudate layers against the surface of the chilled roller to discontinuously bond or laminate the three layers at points and thereby form air pockets on both sides of the then formed impermeable layer between the respective sides of the impermeable layer and the absorbent and printable layers.

The size and shape of the air pockets are determined by the size and shape of the protrusions. The protrusions can be any shape or size with the limitations regarding air pocket size specified above and the height limitations given below constituting preferred limitations for the reasons given.

According to a preferred embodiment of the invention, the height of the protrusions is in the range of 0.03 to 0.07 inches, more preferably about 0.045 inches. If the protrusions are less than 0.03 inches, the air pockets may be too small as defined by this product. And if the protrusions are greater than 0.07 inches, then the air pockets may be too large and the composite wrap may pop open when compressed.

When it is desirable, or specified, that the air pockets are formed on only one side of the composite wrap, the impermeable polymer layer and either the absorbent or the printable layer are first extrusion coated laminated or wax coated to form a first composite having a continuous bond formed between the two respective adjacent surfaces. The composite layer thus formed is then contacted with the final layer as they pass through the nip rollers, as before. In this case, however, because the first composite has already been formed so that a continuous bond is formed between the two surfaces, at least one of the nip rollers must be heated to affect bonding between the final layer and the performed composite. Temperature suitable for this bonding will be determined by the type of materials used in the first composite, and are readily determined by a skilled artisan.

In another embodiment of this composite material, the composite material may be formed by a lamination process in which the extrudate is replaced by a preformed film. The preformed film is then contacted with the absorbent and the printable layers, as before, they pass through the rollers. In this embodiment, at least one of the nip rolls must also be heated to affect bonding between the layers. Temperatures suitable for this bonding will be determined by the type of preformed material, and are readily determined by a skilled artisan.

The following examples are illustrative of the invention embodied herein.

EXAMPLE I

The following example illustrates the improvement in heat retention, steam loss and moisture absorption which are realized by the bag according to the present invention over ordinary wet waxed wrap sheets.

The method involves preparing a hamburger sandwich in a period of eight minutes, allowing it to cool to 170° F., packaging and weighing the hamburger in a prepared bag, and then monitoring the time and temperature of the sandwich as it cools from 160° F. to 130° F.

For those tests performed on Valu-rap, a test pouch was prepared by folding a 6"×12" substrate sample into a 6"×6" square, taking into account the orientation of a multilayer substrate. A strip of ½' double-sided tape was applied to the ½" inner edge of one 6" end of the cut sample. With the sample folded, ½" masking tape was used to seal the two edges adjacent to the fold leaving the pouch open at the edge with the double-sided tape.

The test pouches and bags were weighed and set aside. An iron skillet was heated on an electric burner until it reached approximately 370° F. and a Toastmaster griddle was also heated to approximately 390° F. A frozen hamburger patty was placed into the hot skillet and immediately covered with a round aluminum plate and 500 gram weight. After two minutes the weight and plate were disassembled and the hamburger was flipped over. The plate and weight were placed back on the patty. After four minutes, the hamburger was again flipped. After a minute had elapsed a bun was placed on the griddle, interior of the bun to the grill surface. A rectangular plate was placed onto the bun. The bun was allowed to toast for one minute.

The hamburger was removed from the skillet and placed between the bun halves. A T-type thermocouple was inserted into the side of the hamburger patty to monitor the temperature at the center of the patty. The internal temperature was monitored until it reached 170° F. The thermocouple was then disconnected but was not removed. The sandwich was then placed into the pouch or bag and this was sealed around the thermocouple. The weight of the total package was then recorded. The thermocouple was reconnected and the internal temperature was monitored until it reached 130° F. The thermocouple was then disconnected and the entire package was again weighed. The hamburger was then removed from the bag or pouch which was then weighed alone.

The following data represents 12 samples of ordinary wet-waxed wrap, 3 samples using a bag fashioned from the composite wrap described herein, and 3 perforated bags according to the present invention.

| Sample | Heat Retention | Steam Loss | Moisture Absorbed | Sandwich Moist Loss |
| --- | --- | --- | --- | --- |
| Valu-rap | 13.71 | 0.84 | 0.42 | 1.26 |
| Valu-rap | 16.01 | 0.74 | 0.61 | 1.35 |
| Valu-rap | 16.73 | 0.88 | 0.56 | 1.44 |
| Valu-rap | 17.21 | 1.00 | 0.55 | 1.55 |
| Valu-rap | 16.90 | 0.84 | 0.61 | 1.45 |
| Valu-rap | 18.04 | 0.91 | 0.60 | 1.51 |
| Valu-rap | 14.80 | 0.66 | 0.30 | 0.96 |
| Valu-rap | 15.71 | 0.83 | 0.54 | 1.37 |
| valu-rap | 16.55 | 0.94 | 0.50 | 1.44 |
| Valu-rap | 16.80 | 0.79 | 0.54 | 1.33 |
| Valu-rap | 16.37 | 0.76 | 0.56 | 1.32 |
| Valu-rap | 18.44 | 0.93 | 0.57 | 1.50 |
| Bag | 23.14 | 0.08 | 1.31 | 1.39 |
| Bag | 20.92 | 0.06 | 1.17 | 1.23 |
| Bag | 19.31 | 0.04 | 0.93 | 0.97 |
| Perf-bag | 20.43 | 0.13 | 1.21 | 1.34 |
| Perf-bag | 21.48 | 0.11 | 1.11 | 1.22 |
| Perf-bag | 19.43 | 0.10 | 1.19 | 1.29 |

Heat Retention-Minutes to cool from 160° F. to 130° F.
Steam or Moisture Loss in Grams-Total weight of Hamburger and Packaging at 170° F. minus the weight of the same at 130° F.
Moisture Absorbed by Packaging in Grams-Weight of Package alone after the testing minus the weight of the package Prior to testing.
Total Moisture Loss from Sandwich-Combination of steam loss and moisture absorbed into the package.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of using a perforated package of a composite integral material including:

a first layer of absorbent material;

a second layer of printable material; and a water vapor impermeable polymer layer interdisposed between the first and second layers, wherein at least one of the first and second layers is discontinuously bonded to a respective side of the polymer layer at spaced locations, so that at least one of the first and second layers forms air pockets with the polymer layer at locations between the bond locations, wherein said material forms a package, having at least one major panel and having two lines of perforation allowing folding away of substantially all of said at least one major panel of the package;

said method comprising placing a food item therein.

2. The method according to claim 1, wherein the food item is hot.

3. The method according to claim 1, further comprising sealing the package after placing the food item therein.

4. The method according to claim 3, wherein the bag is sealed by folding or adhesive.

5. The method according to claim 4, further comprising at least two areas of cold seal glue for sealing the package after an item has been placed therein by superimposing the areas and providing pressure.

6. The method according to claim 4, wherein the bag is sealed by folding.

7. The method according to claim 6, wherein said material has sufficient deadfold to allow sealing the bag by folding.

* * * * *